Sept. 12, 1950  R. D. ENGLEHART  2,522,167
AUTOMOBILE BODY RECONDITIONING MACHINE
Filed Dec. 6, 1948  3 Sheets-Sheet 1
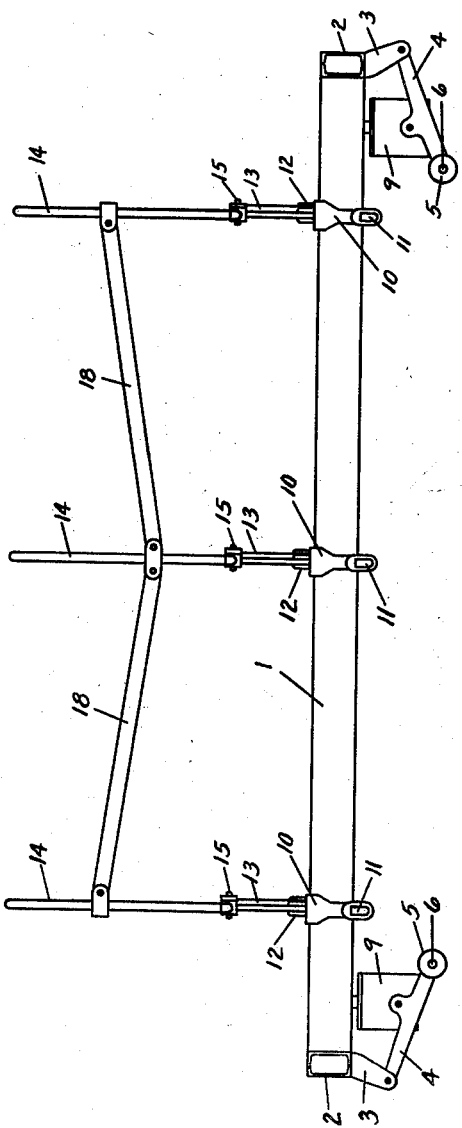
INVENTOR.
R.D. ENGLEHART
BY
Merrill M. Blackburn
Atty.

Sept. 12, 1950   R. D. ENGLEHART   2,522,167
AUTOMOBILE BODY RECONDITIONING MACHINE
Filed Dec. 6, 1948   3 Sheets-Sheet 2
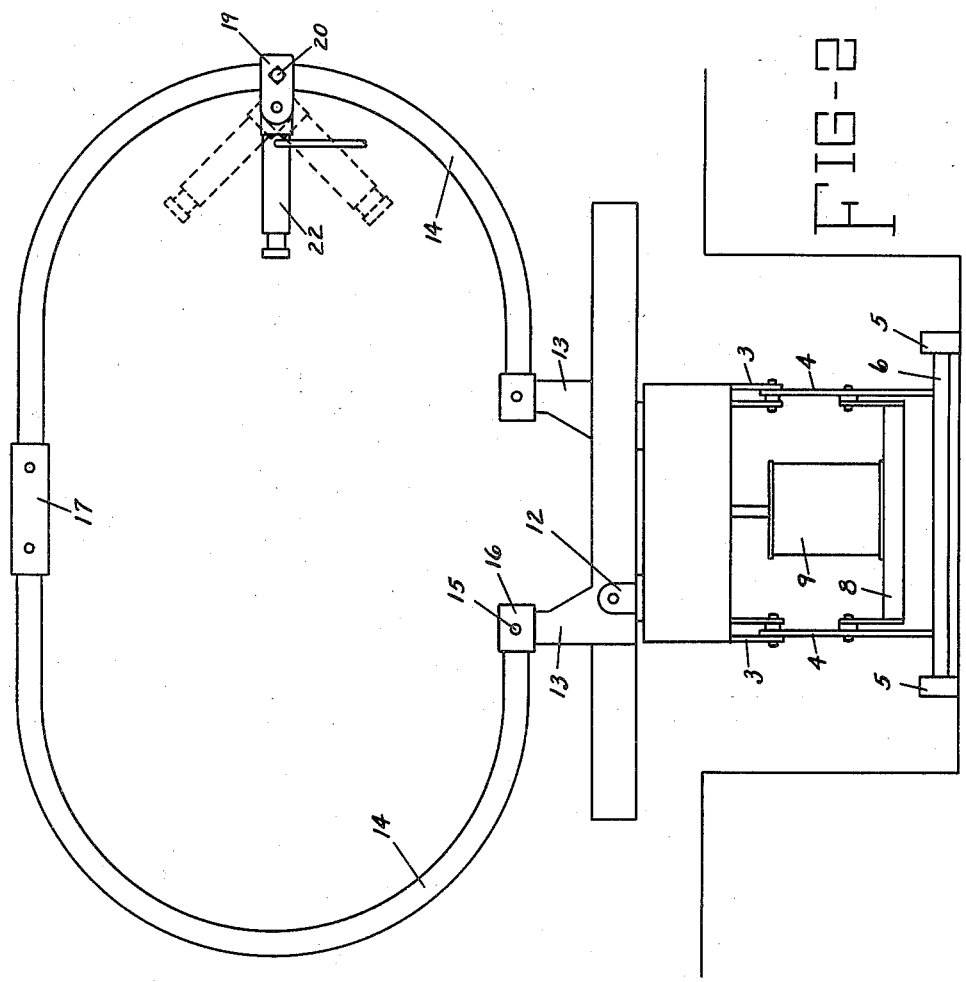
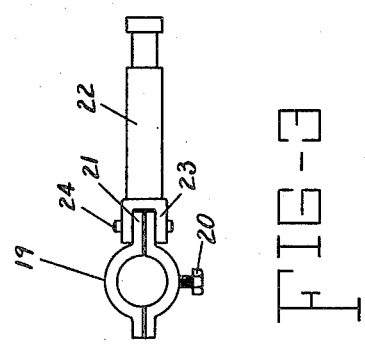
INVENTOR.
R. D. ENGLEHART
BY
Merrill M. Blackburn
Atty.

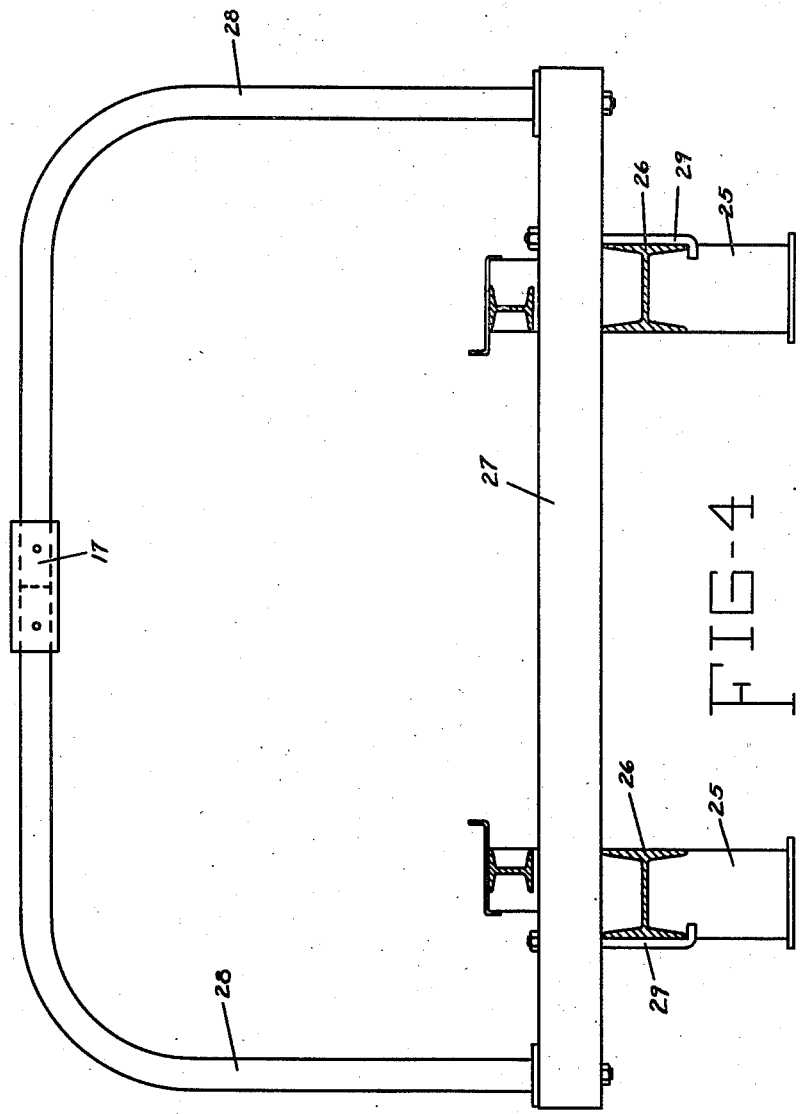

Patented Sept. 12, 1950

2,522,167

UNITED STATES PATENT OFFICE 2,522,167

AUTOMOBILE BODY RECONDITIONING MACHINE

Richard D. Englehart, Davenport, Iowa, assignor to Bee-Line Company, Davenport, Iowa, a copartnership Application December 6, 1948, Serial No. 63,747

1 Claim. (Cl. 153—32)

My present invention relates to the reconditioning of the bodies of motor vehicles which have been injured, as by being in an accident. It is well known that the bodies of automobiles become more or less seriously bent and dented when in accidents, and that they then need to have the bends and dents removed in order that the cars may have a presentable appearance. It was therefore my purpose to design a machine which can be used as an accessory to a machine already in use in the automobile field in working upon the frames and running gears of motor vehicles. It is also one of the objects of my invention to provide a machine which is adapted to support working elements, either outside or inside of an automobile, so that pressure can be applied in any direction needed for the reconditioning of the body of the vehicle. My invention further comprises such objects, advantages, and capabilities as will hereafter appear and as are inherent in the structure disclosed herein.

In the drawings annexed hereto and forming a part hereof,

Fig. 1 is a side elevation of a press such as used in working upon the frames and running gears of motor vehicles, with the subject matter of this invention shown as mounted upon the press;

Fig. 2 is an end view of the press shown in Fig. 1, with the present tool-supporting means shown as carried by the press;

Fig. 3 is a plan view of the hydraulic jack shown in Fig. 2, the same being shown as detached from the supporting framework; and Fig. 4 is a front elevation of a modified form of this invention for use with a different type of frame machine.

Reference will now be made in greater detail to the annexed drawings for a more complete description of this invention. The press shown in Figs. 1 and 2 is of a well known type and may be fabricated from cylindrical pipe but is preferably made from channel irons with their open faces toward each other and their edges welded together to form rectangular channels 1. Cross channels 2 connect a plurality of the pipes 1 together at their ends so as to form a substantially rectangular frame. Brackets 3 project downwardly from the ends of the frame and have lifting units connected thereto to serve as hoists for raising the press frame. These lifting units comprise wheels 5 mounted on axles 6 from which rise levers 4 which are pivotally connected to the brackets 3. Pivotally suspended from the levers 4 is a platform 8 on which is mounted a hydraulic jack 9. The piston of this jack presses against the press frame and causes raising thereof. Hence it will be seen that the press can be adjusted as to height in order to get the supports of this invention at the proper elevation relatively to the car body.

Clevis-like members 10 are mounted on the tubes or rectangular channels 1 of the press frame and are clamped thereto by tapered pins 11 passing through holes in the bottom ends of the clevis-like members 10. Pivot members 12 extend through holes in the central parts of the clevis-like members and may be rotated therein as needed. These pivot members 12 have their upper ends slotted for the reception of abutment members 13 which serve as supports for the tool-supporting frame members 14 which have holes in one end for the reception of an end of the angular abutment members 13. A pin 15 passes through and connects the parts 13 and 16. Preferably, the arcuate frame members 14 extend outwardly beyond the sides of the automobile, then upwardly, and then inwardly through a door or window, the parts being connected inside of the car by a connector 17 which holds them assembled. Tie-members 18 are vertically adjustable on the arcuate frame members 14 and serve to tie them together so that they will be less liable to distortion than if each was standing separately.

Clamps 19 surround the arcuate frame members 14 and may be fastened in place thereon by means of set screws 20. The clamps 19 have outwardly extending arms 21 for connection to the hydraulic jacks 22 which have U-shaped members 23 attached to the bases thereof and which are connected to the arms 21 by pins 24 about which the jacks 22 may be turned. Also, the clamps 19 may be turned about the arcuate member 14, thus making it possible to exert force either outwardly or inwardly upon the car body.

The structure shown in Fig. 4 is adapted for use with a frame machine of the type shown broadly by the Wochner Patent No. 1,907,925, except that the cross-beams are slidable longitudinally of the frame. The frame used is one already old in the art, but unpatented. A plurality of supports 25 support the frame members 26 on which the cross-bars 27, preferably three or four, are arranged and adapted for sliding motion longitudinally of the members 26. Such adjustment is desirable in order to place the cross-bars 27 directly below the part of the body of the motor vehicle upon which it is desired to operate. From these cross-bars 27 rise arch members 28 which are securely fastened to the cross-bars. These arch members 28 rise from the crossbars, located below the bottoms of the wheels, and turn inwardly to positions above the vehicle body or within the body so they can support the jacks, as shown in Fig. 2, for the purpose of exerting pressure upon the vehicle body, whereby to remove bends and dents from the body. The crossbars 27 are held down to the frame members 26 by clamping hooks 29, as is clear from Fig. 4.

It will of course be understood that the specific description of structure set forth above may be departed from without departing from the spirit of this invention as disclosed in this specification and as defined by the appended claim.

Having now described my invention, I claim:

An automobile body reconditioning machine comprising a frame adapted to be positioned below an automobile to be reconditioned, jacking means for raising and lowering said frame, supporting units detachably carried by said frame and adjustable along said frame lengthwise of an automobile positioned thereover, said supporting units being semicircular in shape and extending outwardly from said frame below said automobile, thence upwardly about the sides of said automobile, and together with the ends thereof in proximity to each other within said automobile, means for joining the proximal ends of said units at a point within an automobile when the latter is in position, and jacking means adjustably secured to said units for cooperating with said first mentioned jacking means for exerting pressure against an automobile so positioned.

RICHARD D. ENGLEHART.

REFERENCES CITED

The following references are of record in the file of this patent:

UNITED STATES PATENTS

| Number | Name | Date |
|---|---|---|
| 1,993,387 | Smith | Mar. 5, 1935 |
| 2,151,063 | Weaver | Mar. 21, 1939 |
| 2,442,939 | Schram | June 8, 1948 |